United States Patent
Sasaki et al.

(10) Patent No.: US 7,174,988 B2
(45) Date of Patent: Feb. 13, 2007

(54) POWER STEERING SYSTEM

(75) Inventors: Mitsuo Sasaki, Kanagawa (JP); Yuji Torizawa, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/900,189

(22) Filed: Jul. 28, 2004

(65) Prior Publication Data

US 2005/0023073 A1    Feb. 3, 2005

(30) Foreign Application Priority Data

Jul. 29, 2003   (JP)   ............................. 2003-202917

(51) Int. Cl.
   *B62D 5/06*    (2006.01)
   *B62D 5/065*   (2006.01)

(52) U.S. Cl. ...................... 180/422; 180/439; 180/441; 180/417; 60/473; 60/476; 60/475; 91/437

(58) Field of Classification Search ................ 180/422, 180/439, 441, 417; 417/282; 60/39.08, 60/473, 476, 475; 91/437
   See application file for complete search history.

(56) References Cited

U.S. PATENT DOCUMENTS

| | | | | |
|---|---|---|---|---|
| 4,838,767 A | * | 6/1989 | Ohe et al. ..................... 417/299 |
| 5,279,380 A | * | 1/1994 | Frank et al. ................. 180/422 |
| 5,513,720 A | * | 5/1996 | Yamamoto et al. ......... 180/421 |
| 5,547,349 A | * | 8/1996 | Kimura et al. .............. 417/282 |
| 6,953,102 B2 | * | 10/2005 | Kurata et al. ............... 180/442 |
| 2003/0024758 A1 | * | 2/2003 | Fujita ......................... 180/422 |
| 2003/0178241 A1 | * | 9/2003 | Yokota et al. .............. 180/441 |
| 2005/0161278 A1 | * | 7/2005 | Hamischfeger et al. ..... 180/441 |

FOREIGN PATENT DOCUMENTS

JP    2002-145088 A    5/2002

* cited by examiner

*Primary Examiner*—Lesley D. Morris
*Assistant Examiner*—Marlon Arce-Diaz
(74) *Attorney, Agent, or Firm*—Sughrue Mion, PLLC

(57) ABSTRACT

A power steering system includes a reversible-type oil pump supplying hydraulic fluid to first and second pressure chambers of a hydraulic power cylinder through first and second passages and having first and second discharge ports, and a branch passage conveying part of hydraulic fluid discharged from the discharge ports of the oil pump to the outside of the pressure chambers of the power cylinder, wherein the branch passage has a passage sectional area greater than a total leak sectional area of the oil pump.

11 Claims, 7 Drawing Sheets

FIG.6
FIRST EMBODIMENT

POWER STEERING SYSTEM

BACKGROUND OF THE INVENTION

The present invention relates to a power steering system.

Typically, in the state of steering maintained after performing assist for steering, the power steering system carries out control for decreasing the rotational speed of an electric motor so as not to increase the hydraulic pressure within an apply-side pressure chamber. Then, since a closed circuit connecting a reversible-type oil pump to the apply-side pressure chamber is maintained at the high pressure, the oil pump produces great surging. In addition to surging, the electric motor and the oil pump also produce dynamic friction. With this, in some instances, the electric motor cannot maintain its rotation speed to repeatedly carry out rotation and stop until subsequent assist for steering is performed, providing disagreeable feel to a driver.

In order to cope with this problem, there is a power steering system wherein a branch passage is arranged to convey part of discharged oil of the oil pump to the outside of the two pressure chambers in a branched way. Specifically, discharged oil of the oil pump flows to the outside of a hydraulic power cylinder through the branch passage, reducing surging of the oil pump in the state of steering maintained after performing assist for steering, thus achieving restraint of pump stop.

SUMMARY OF THE INVENTION

With the above power steering system, however, since the branch passage includes a clearance formed between a pair of gears (external and internal gears) and a side plate, variations in dimension of the clearance occur due to manufacturing error of the oil pump, leading to difficult control of the leak amount for the oil pump.

It is, therefore, an object of the present invention to provide a power steering system which allows prevention of stop of the reversible-type oil pump from occurring due to surging, etc. at pump low rotation regardless of the leak amount for the oil pump.

The present invention provides generally a power steering system, which comprises: a hydraulic power cylinder which assists a steering force of a steering mechanism coupled to steered wheels, the power cylinder comprising first and second pressure chambers; a reversible-type oil pump which supplies a hydraulic fluid to the first and second pressure chambers of the power cylinder through first and second passages, the oil pump comprising first and second discharge ports; an electric motor which rotates the oil pump in the normal and reverse directions; a branch passage which conveys part of the hydraulic fluid discharged from the first and second discharge ports of the oil pump to the outside of the first and second pressure chambers of the power cylinder, the branch passage having a passage sectional area greater than a total leak sectional area of the oil pump; a steering-condition sensing circuit which senses a steering condition made by a driver; and a motor control circuit which controls the electric motor, the motor control circuit outputting a drive command to the electric motor in accordance with the sensed steering condition.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings wherein like references designate like parts throughout the views, a description will be made about preferred embodiments of a power steering system according to the present invention.

Figure 1:
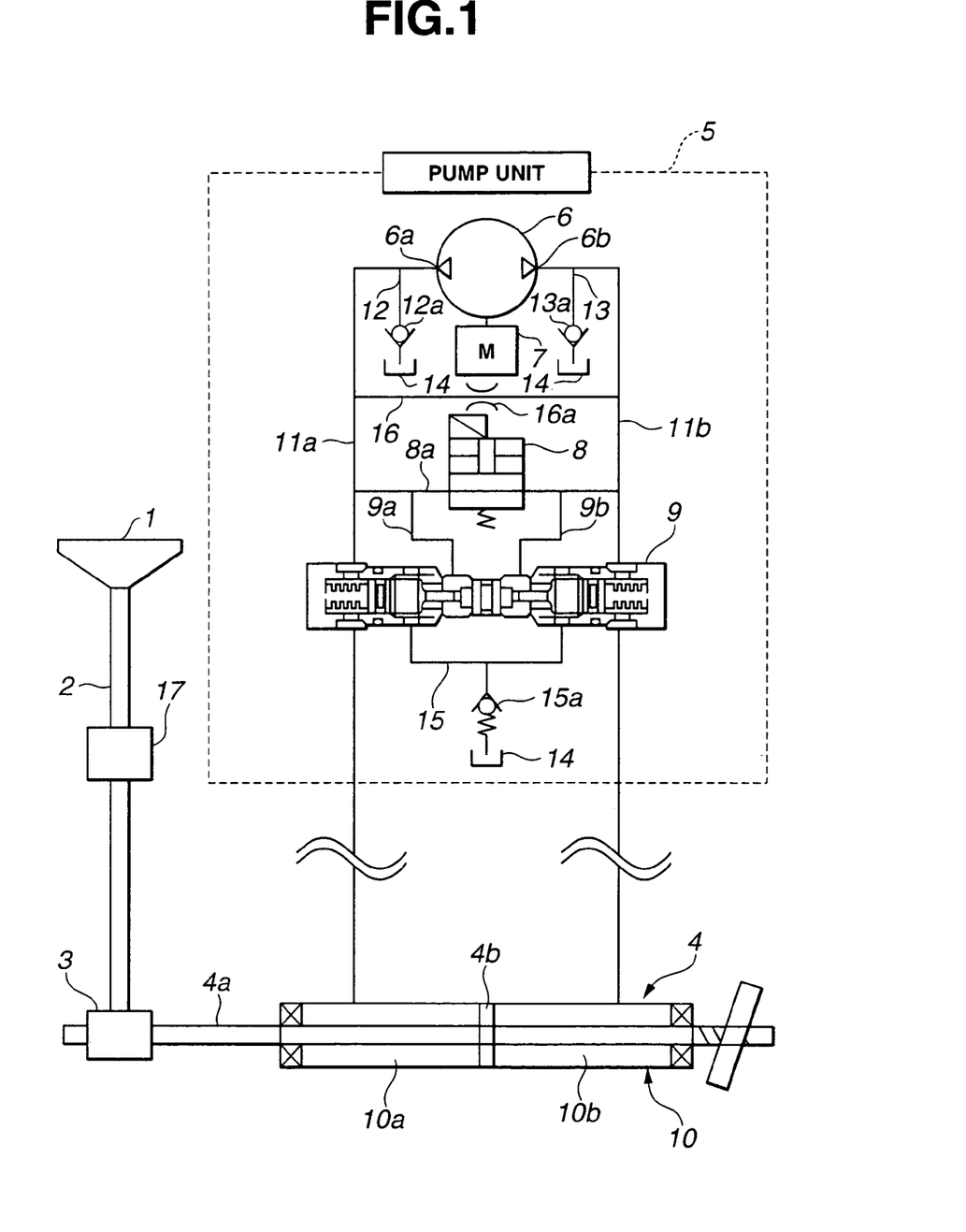
FIG. 1 is a schematic block diagram showing a first embodiment of a power steering system according to the present invention.

Referring to FIGS. 1–6, there is shown first embodiment of the present invention. Referring to FIG. 1, the power steering system comprises a steering wheel 1, a steering shaft 2, a rack-and-pinion steering ring 3, a power steering mechanism 4 for assisting a steering force produced by a driver, and a pump unit 5.

Pump unit 5 comprises a reversible-type oil pump 6, an electric motor 7 for rotating oil pump 6 in the normal and reverse directions, a fail-safe valve 8, a return check valve 9, and a branch passage 16.

Oil pump 6 has a pair of first and second discharge ports 6a, 6b serving to switch the discharge direction by the direction of rotation of electric motor 7. First discharge port 6a communicates with a first pressure chamber 10a of a hydraulic power cylinder 10 of power steering mechanism 4 through a first passage 11a. On the other hand, second discharge port 6b communicates with a second pressure chamber 10b of hydraulic power cylinder 10 through a second passage 11b.

Fail-safe valve 8 is arranged on a passage 8a for providing fluid communication between first and second passages 11a, 11b without involvement of oil pump 6. Fail-safe valve 8 includes a normally-open valve which is closed when it is energized in accordance with a command signal of an electronic control unit (ECU) or motor control unit, not shown, and is opened when it is not energized. With this, even when some anomaly occurs in the steering system to shut off power, fluid communication can be provided between first and second pressure chambers 10a, 10b, ensuring manual steering without assist torque.

Discharge port 10a of oil pump 6 is supplied with oil from a reservoir tank 14 through a passage 12 communicating with first passage 11a. On the other hand, discharge port 10b is supplied with oil from reservoir tank 14 through a passage 13 communicating with second passage 11b. Check valves 12a, 13a are arranged on passages 12, 13 to allow oil passage from reservoir tank 14 to discharge ports 6a, 6b and inhibit oil passage from discharge ports 6a, 6b to reservoir tank 14.

Return check valve 9 includes a mechanical valve driven by a pressure difference between first and second passages 11a, 11b. Specifically, when the hydraulic pressure within first passage 11a is higher than that within second passage 11b, return check valve 9 provides fluid communication between a bypass passage 9b communicating with second passage 11b through passage 8a and reservoir tank 14, opening second pressure chamber 10b to the atmosphere. On the other hand, when the hydraulic pressure within second passage 11b is higher than that within first passage 11a, return check valve 9 provides fluid communication between a bypass passage 9a communicating with first passage 11a through passage 8a and reservoir tank 14, opening first pressure chamber 10a to the atmosphere. Specifically, the hydraulic pressure within a non-apply-side circuit is quickly drained to reservoir tank 14, accelerating a rise in hydraulic pressure within an apply-side circuit, achieving enhanced steering responsivity. A one-way valve 15a is arranged on a passage 15 for providing fluid communication between return check valve 9 and reservoir tank 14 so as to allow oil flow from return check valve 9 to reservoir tank 14 and inhibit oil flow in the reverse direction.

A torque sensor or steering-condition sensing means 17 is provided to steering shaft 2 to sense a steering torque produced by the driver. The steering torque sensed by torque sensor 17 is output as a steering-torque signal to the ECU.

When the driver operates steering wheel 1, the direction of rotation of electric motor 7 is switched in accordance with the direction of rotation and the steering torque to supply or discharge oil between first and second pressure chambers 10a, 10b of hydraulic power cylinder 10, thus assisting a driver's steering force. Specifically, referring to FIG. 1, when steering wheel 1 is turned to the right, electric motor 7 is driven in the direction that the hydraulic pressure is supplied from second pressure chamber 10b to first pressure chamber 10a, assisting a piston 4b moving with a rack shaft 4a toward second pressure chamber 10b.

Branch passage 16 is a passage for providing fluid communication between first and second passages 11a, 11b without involvement of oil pump 6, and has an orifice 16a provided therewith to adjust the flow rate.

Figure 2:
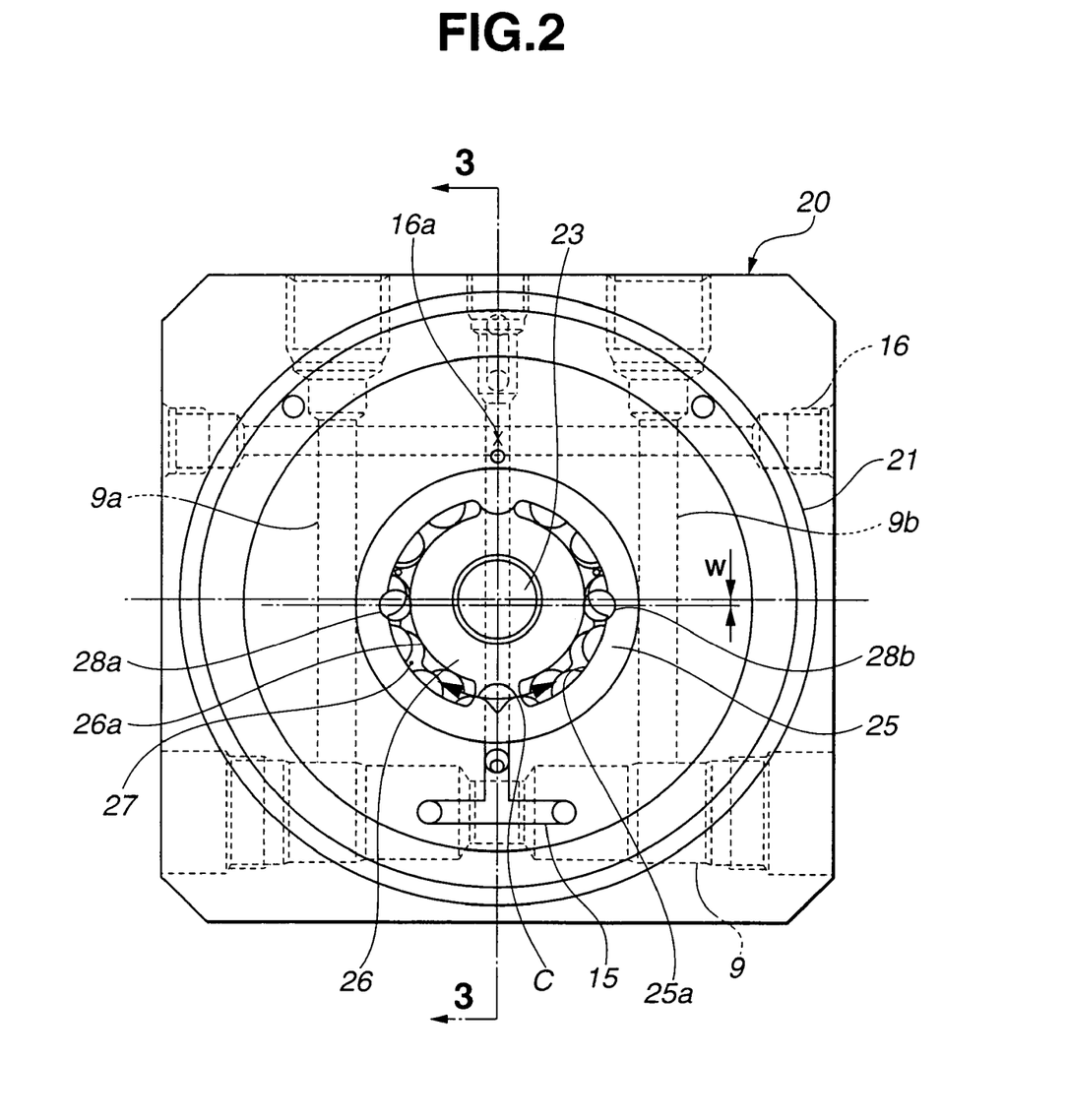
FIG. 2 is a view showing a pump housing of a reversible-type oil pump.
Figure 3:
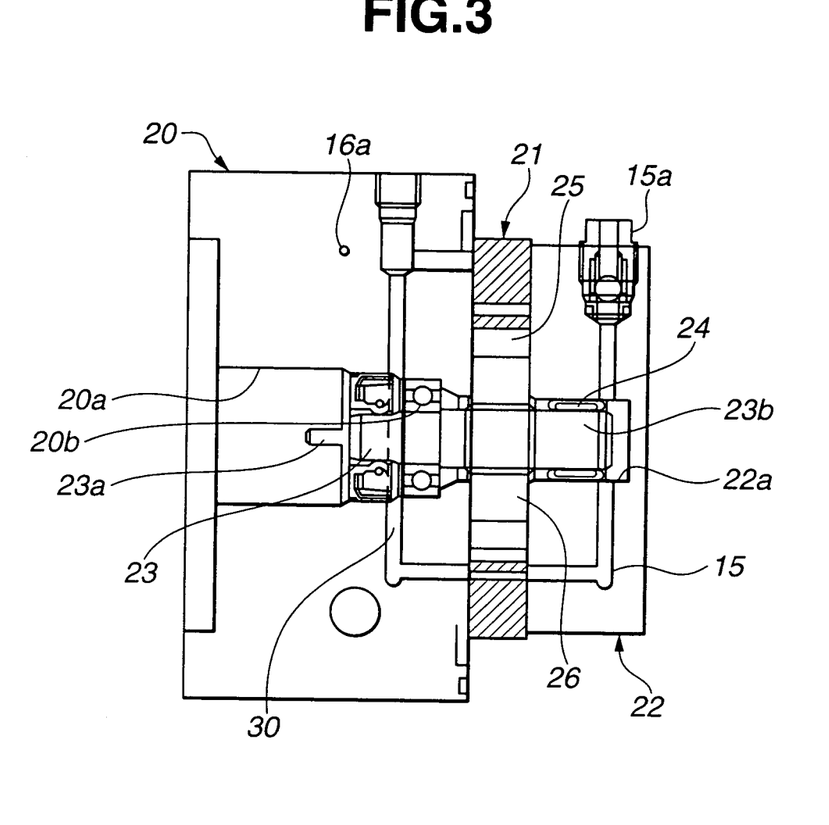
FIG. 3 is a sectional view taken along the line 3—3 in FIG. 2.

Next, the structure of oil pump 6 will be described. Referring to FIGS. 2 and 3, oil pump 6 comprises a pump housing 20, a cam ring 21, and a pump cover 22, which are fixed together by bolts or the like, not shown.

Pump housing 20 is formed with a through hole 20a in which a driving shaft 23 is arranged. Driving shaft 23 is rotatably supported on a shaft support portion 20b. Driving shaft 23 has a first end 23a coupled to an output shaft of electric motor 7 and a second end 23b arranged through cam ring 21 and loosely engaged in a recess 22a of pump cover 22 through a bush 24.

Return check valve 9 is formed in the lower part of pump housing 20, whereas bypass passages 9a, 9b and part of hydraulic passage 15 are formed in pump housing 20 to communicate with return check valve 9. Moreover, branch passage 16 having in the center orifice 16a is formed in the upper part of pump housing 20.

Ring-like external and internal gears 25, 26 are arranged in cam ring 21. External gear 25 is arranged between cam ring 21 and internal gear 26, and has teeth 25a formed on the inner periphery and being larger in number than internal gear 26 by one. Internal gear 26 has an inner periphery splined to driving shaft 23, and an outer periphery having teeth 26a formed by a higher-order function curve including a trochoid curve as a fundamental. External and internal gears 25, 26 are meshed closely with their centers of rotation being offset vertically by a predetermined amount W (refer to FIG. 2), defining a plurality of pump chambers 27 between adjacent teeth 25a, 26a.

The volume of each pump chamber 27 varies with rotation of external and internal gears 25, 26. Specifically, the volume of pump chamber 27 is zero in the position where teeth 25a, 26a are meshed completely. It becomes maximum at the position where the mesh of the two is released, and decreases in the section that the mesh starts.

Part of passage 15 is formed in the lower part of cam ring 21 to extend upward from the lower part of pump cover 22 through recess 22a, having an upper end provided with one-way valve 15a.

Figure 4:
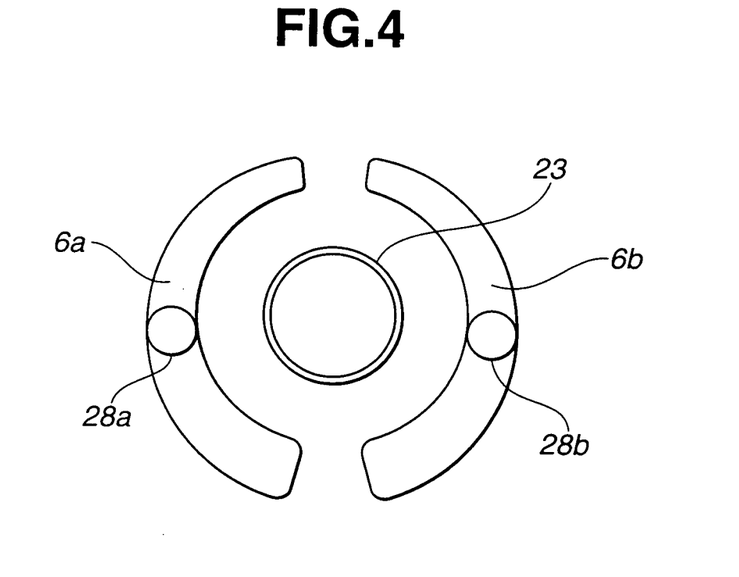
FIG. 4 is a schematic view showing a cam-ring contact face of the pump housing.

Referring to FIG. 4, first discharge port 6a having a crescent shape and a predetermined depth is formed in the contact face of pump housing 20 with cam ring 21 to communicate with the section that the volume of pump chamber 27 increases. In the position opposite to first discharge port 6a, second discharge port 6b having a crescent shape and a predetermined depth is formed to communicate with the section that the volume of pump chamber 27 decreases. First and second discharge openings 28a, 28b are arranged in first and second discharge ports 6a, 6b to communicate with first and second passages 11a, 11b.

With oil pump 6 constructed as described above, the passage sectional area of orifice 16a of branch passage 16 is greater than the total leak sectional area of oil pump 6. Specifically, an oil leakage occurs from a clearance between external and internal gears 25, 26, i.e. lip clearance C (refer to FIG. 2), and a clearance between pump housing 20 and cam ring 21. The passage sectional area of orifice 16a is set to be greater than the total sectional area of such leak portions.

Next, operation of the first embodiment will be described.
During Assist for Steering When operating steering wheel 1, a drive current is output to electric motor in accordance with a torque-sensor signal of torque sensor 17, driving oil pump 6. With this, the hydraulic pressure to be supplied to pressure chambers 10a, 10b of hydraulic power cylinder 10, obtaining steering force assisted.

During Steering Maintained after Performing Assist for Steering

During steering maintained after performing assist for steering, oil pump 6 is driven in such a way that electric motor 7 for driving oil pump 6 does not stop. Then, part of oil discharged from one of first and second discharge ports 6a, 6b moves from the high-pressure side of first and second passage 11a, 11b to the low-pressure side through branch passage 16. That is, part of discharged oil is conveyed to the outside of hydraulic power cylinder 10.

Since the passage sectional area of orifice 16a of branch passage 16 is set to be greater than the total leak sectional area of oil pump 6, discharged oil flowing through branch passage 16 is always greater than the leak amount for oil pump 6.

Comparison Between the First Embodiment and the Related Art

Examine the related art comprising no branch passage 16 and adopting adjustment of the leak amount for oil pump 6, i.e. the sectional area and length of a clearance between pump housing 20 and cam ring 21, instead.

In that case, achievement of necessary and sufficient leak amount requires higher working and assembling accuracies of pump housing 20 and cam ring 21, taking much time and effort for working and assembling, leading to an increase in manufacturing cost. Moreover, since the leak amount for oil pump 6 varies due to individual difference between products, the branching flow rate cannot be set uniformly for all products.

On the other hand, in the first embodiment, branch passage 16 includes a through hole formed in pump housing 20, and is provided with orifice 16a having passage sectional area set to be greater than the leak sectional area of oil pump 6. Thus, with very simple setting, necessary and sufficient branching flow rate can always be obtained without being affected by variations in leak amount for oil pimp 6.

Figure 5:
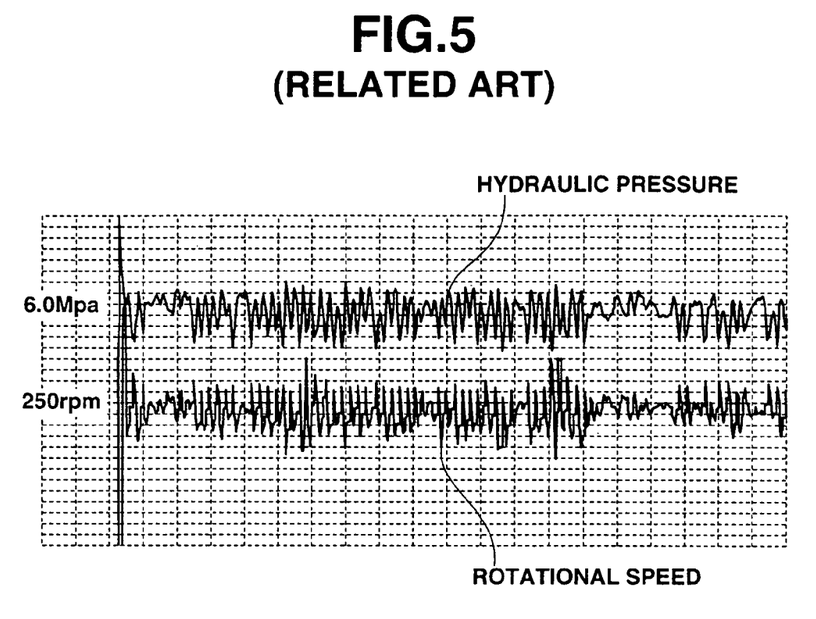
FIG. 5 is a graph illustrating operation of the related art.

Referring to FIG. 5, there is shown relationship between the hydraulic pressure within the apply-side pressure chamber after performing assist for steering and the rotational speed (rpm) of electric motor 7 in the related-art electric power steering system having no branch passage. As is apparent from FIG. 5, the hydraulic pressure within the apply-side pressure chamber is unstable due to occurrence of surging, and deviates greatly from a target value 6.0 Mpa. With this, electric motor 7 has rotational speed lowered many times to 250 rpm equivalent to substantial rotation stop, carrying out stop and drive repeatedly.

Figure 6:
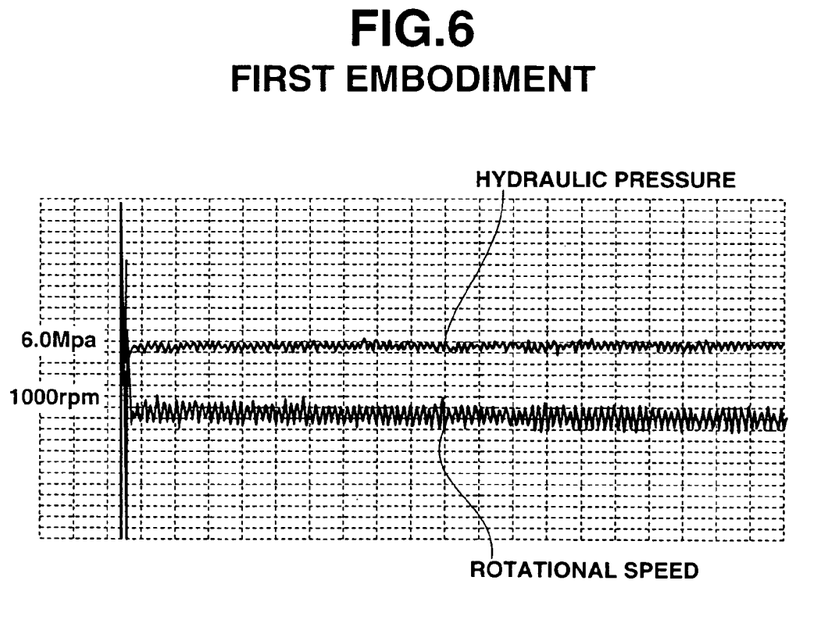
FIG. 6 is a graph similar to FIG. 5, illustrating operation of the first embodiment.

On the other hand, in the first embodiment, referring to FIG. 6, sufficient amount of discharged oil to the apply-side pressure chamber can be conveyed through branch passage 16, achieving restrained surging, allowing the rotational speed of electric motor 7 to be maintained at about 1,000 rpm, i.e. at a value greater than 250 rpm equivalent to substantial rotation stop.

The First Embodiment Produces the Following Effects:

1) Branch passage 16 is arranged to convey discharged oil of oil pump 6 to the outside of hydraulic power cylinder 10, and is provided with orifice 16a having passage sectional area set to be greater than the leak sectional area of oil pump 6. Thus, necessary and sufficient branching flow rate can always be obtained without being affected by variations in leak amount for oil pump 6.

2) Branch passage 16 is formed in pump housing 20. Due to high rigidity of pump housing 20, surging of oil pump 6 is reduced by passing discharged oil through branch passage 16. Moreover, as compared with when branch passage 16 includes a member such as pipe, which is separate and distinct from pump housing 20, vibrations of branch passage 16 itself due to surging can be prevented from occurring.

3) Branch passage 16 is arranged parallel to oil pump 6 to communicate with first and second passages 11a, 11b, allowing absorption of vibrations in leak amount for oil pump 6. That is, the leak amount for oil pump 6 can be set at a constant value without relying on working accuracy of products, resulting in uniformalized product accuracy without enhancing the working accuracy.

Figure 7:
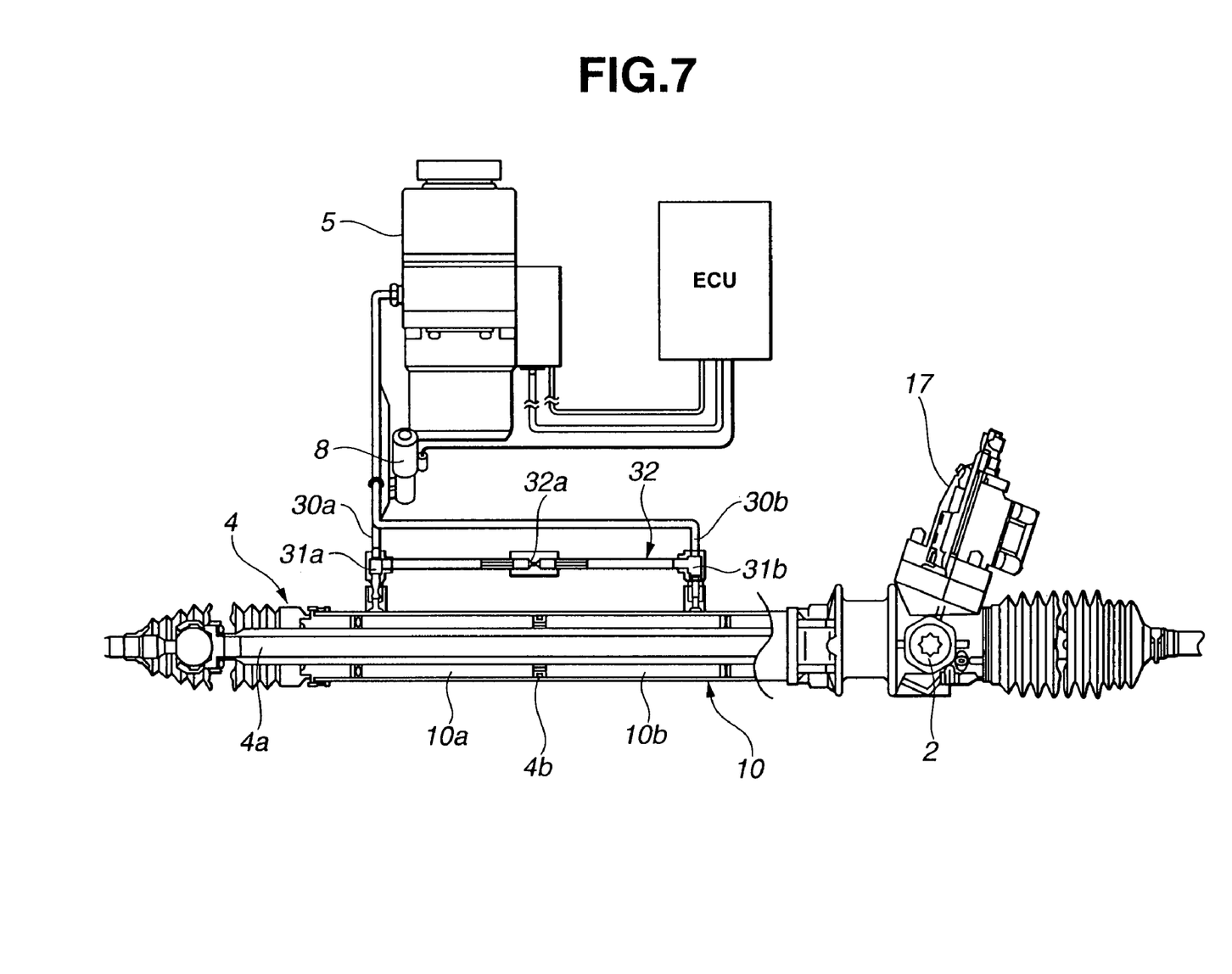
FIG. 7 is a schematic front view showing a second embodiment of the present invention.

Referring to FIG. 7, there is shown second embodiment of the present invention which is substantially the same as the first embodiment except that the branch passage includes a pipe arranged outside pump unit 5.

Specifically, the branch passage comprises first and second pipes 30a, 30b corresponding to first and second passages 11a, 11b in the first embodiment, first and second branch pipes 31a, 31b connected to first and second pipes 30a, 30b, and a connection pipe 32 for connecting first and second branch pipes 31a, 31b. An orifice 32a is arranged in the middle of connection pipe 32 to adjust the flow rate. In the same way as the first embodiment, the passage sectional area of orifice 32a is set to be greater than the leak sectional area of oil pump 6.

The Second Embodiment Produces the Following Effect:

4) The branch passage includes connection passage 32 connecting first and second pipes 30a, 30b, providing higher flexibility of layout, allowing easy additional mounting of the branch passage to an existing system.

Figure 8:
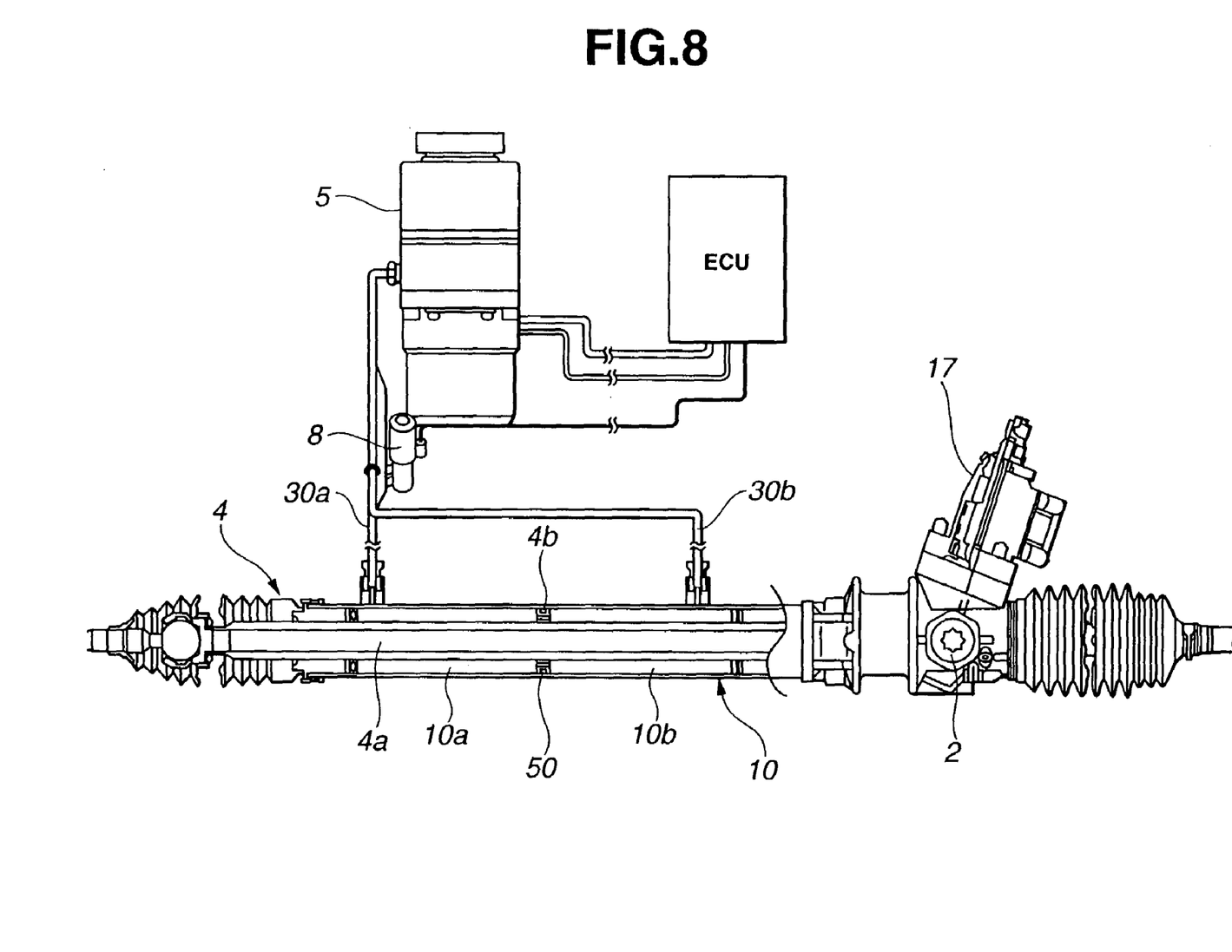
FIG. 8 is a view similar to FIG. 7, showing a third embodiment of the present invention.

Referring to FIG. 8, there is shown third embodiment of the present invention which is substantially the same as the first and second embodiments except that the branch passage includes a through hole 50 formed in piston 4b which defines first and second pressure chambers 10a, 10b of hydraulic power cylinder 10 and providing fluid communication between first and second pressure chambers 10a, 10b. In the same way as orifices 16a, 32a in the first and second embodiments, the passage sectional area of through hole 50 is set to be greater than the leak sectional area of oil pump 6.

The Third Embodiment Produces the Following Effect:

5) The branch passage includes through hole 50 formed in piston 4b defining first and second pressure chambers 10a, 10b of hydraulic power cylinder 10, providing a damper effect to hydraulic power cylinder 10, resulting in enhanced shock absorbency upon impact of the steering wheel.

As described above, according to the present invention, sufficient flow rate of discharged oil can always be conveyed to the outside of the power cylinder regardless of the leak amount for the oil pump, achieving restrained pressure rise within the apply-side pressure chamber, allowing prevention of surging at pump low rotation and thus stop of the oil pump from occurring.

Further, a leakage in the oil pump occurs mainly from a clearance between the external and internal gears and a clearance between the pump housing and the cam ring. Setting of the passage sectional area of the branch passage in accordance with those clearances allows appropriate restraint of a pressure rise within the apply-side pressure chamber.

Still further, the pump housing is higher in rigidity than a steel pipe, allowing restraint of vibrations of the branch passage itself due to surging.

Still further, the passage sectional area of the branch passage can be determined at the orifice, allowing the discharge characteristics of product oil pumps to be maintained uniform.

Furthermore, the branch passage enjoys enhanced flexibility of layout, allowing easy its additional mounting to an existing system.

Further, it can provide a damper effect to the power cylinder, resulting in enhanced shock absorbency upon impact of the steering wheel.

Having described the present invention in connection with the preferred embodiments, it is noted that the present invention is not limited thereto, and various changes and modifications can be made without departing from the scope of the invention.

Figure 9:
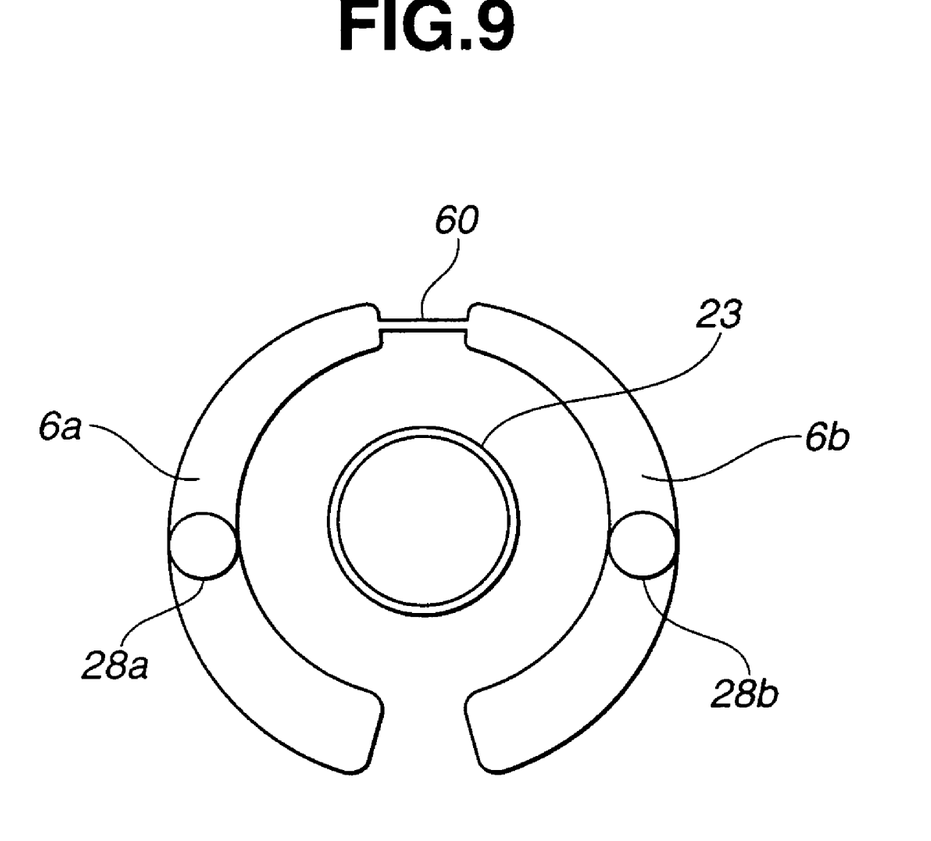
FIG. 9 is a view similar to FIG. 4, showing a variation of a communication passage.

By way of example, in the first embodiment, the branch passage includes a through hole formed in pump housing 20. Optionally, referring to FIG. 9, the branched passage may include a groove 60 for providing fluid communication between the first and second discharge ports 6a, 6b of pump housing 20.

The entire teachings of Japanese Patent Application P2003-202917 filed Jul. 29, 2003 are hereby incorporated by reference.

What is claimed is:

1. A power steering system, comprising:
a hydraulic power cylinder which assists a steering force of a steering mechanism coupled to steered wheels, the power cylinder comprising first and second pressure chambers;

a reversible-type oil pump which supplies a hydraulic fluid to the first and second pressure chambers of the power cylinder through first and second passages, the oil pump comprising first and second discharge ports;

an electric motor which rotates the oil pump in the normal and reverse directions;

a branch passage which conveys part of the hydraulic fluid discharged from the first and second discharge ports of the oil pump to the outside of the first and second pressure chambers of the power cylinder, the branch passage having a passage sectional area greater than a total leak sectional area of the oil pump;

a steering-condition sensing circuit which senses a steering condition made by a driver; and a motor control circuit which controls the electric motor, the motor control circuit outputting a drive command to the electric motor in accordance with the sensed steering condition.

2. The power steering system as claimed in claim 1, wherein the oil pump comprises:

a driving shaft connected to the electric motor;
an internal gear connected to the driving shaft;
an external gear meshed with the internal gear;
a cam ring which slidably accommodates the external gear; and
a pump housing which holds the internal gear, the external gear, and the cam ring,
wherein the total leak sectional area of the oil pump corresponds to a total of a clearance between the internal and external gears and a clearance between the pump housing and the cam ring.

3. The power steering system as claimed in claim 1, wherein the branch passage is formed in the oil pump.

4. The power steering system as claimed in claim 3, wherein the branch passage is provided with an orifice.

5. The power steering system as claimed in claim 3, wherein the branch passage includes a communication passage for providing fluid communication between the first and second discharge ports of the oil pump.

6. The power steering system as claimed in claim 1, wherein the branch passage includes pipes for connecting the first and second discharge ports of the oil pump and the first and second pressure chambers of the power cylinder.

7. The power steering system as claimed in claim 6, wherein the branch passage is provided with an orifice.

8. The power steering system as claimed in claim 1, wherein the branch passage is formed in the power cylinder.

9. A power steering system, comprising:

a hydraulic power cylinder which assists a steering force of a steering mechanism coupled to steered wheels, the power cylinder comprising first and second pressure chambers;

a reversible-type oil pump which supplies a hydraulic fluid to the first and second pressure chambers of the power cylinder through first and second passages, the oil pump comprising first and second discharge ports;

an electric motor which rotates the oil pump in the normal and reverse directions;

a branch passage which conveys part of the hydraulic fluid discharged from the first and second discharge ports of the oil pump to the outside of the first and second pressure chambers of the power cylinder, the branch passage having a passage sectional area greater than a total leak sectional area of the oil pump;

means for sensing a steering condition made by a driver; and means for controlling the electric motor, the controlling means outputting a drive command the electric motor in accordance with the sensed steering condition.

10. A motor vehicle, comprising:

steered wheels;

a steering mechanism coupled to the steered wheels;

a hydraulic power cylinder which assists a steering force of the steering mechanism, the power cylinder comprising first and second pressure chambers;

a reversible-type oil pump which supplies a hydraulic fluid to the first and second pressure chambers of the power cylinder through first and second passages, the oil pump comprising first and second discharge ports;

an electric motor which rotates the oil pump in the normal and reverse directions;

a branch passage which conveys part of the hydraulic fluid discharged from the first and second discharge ports of the oil pump to the outside of the first and second pressure chambers of the power cylinder, the branch passage having a passage sectional area greater than a total leak sectional area of the oil pump;

a steering-condition sensing circuit which senses a steering condition made by a driver; and a motor control circuit which outputs a command for driving the electric motor in accordance with the sensed steering condition.

11. The power steering system as claimed in claim 2, wherein a part of the first passage is formed in the pump housing, a part of the second passage is formed in the pump housing, and the branch passage connects the part of the first passage and the part of the second passage and is formed in the pump housing.

* * * * *